(12) United States Patent
Lin

(10) Patent No.: US 9,168,558 B2
(45) Date of Patent: Oct. 27, 2015

(54) GLUE DISPENSING APPARATUS WITH HEATING UNIT AND GLUE DISPENSING METHOD

(71) Applicant: HON HAI PRECISION INDUSTRY CO., LTD., New Taipei (TW)

(72) Inventor: Mong-Tung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 225 days.

(21) Appl. No.: 13/873,201

(22) Filed: Apr. 29, 2013

(65) Prior Publication Data

US 2014/0060697 A1    Mar. 6, 2014

(30) Foreign Application Priority Data

Aug. 30, 2012    (TW) .............................. 101131634 A

(51) Int. Cl.
| | |
|---|---|
| *B43K 5/00* | (2006.01) |
| *B43K 8/06* | (2006.01) |
| *B05C 5/00* | (2006.01) |
| *B05C 5/02* | (2006.01) |
| *B29D 11/00* | (2006.01) |

(52) U.S. Cl.
CPC ............... *B05C 5/001* (2013.01); *B05C 5/0212* (2013.01); *B29D 11/00865* (2013.01)

(58) Field of Classification Search
CPC ........ B05C 5/001; B05C 5/0212; B05C 1/00; B05C 1/027; G02B 7/025
USPC .............. 401/1, 209, 215, 196, 198; 427/162, 427/164, 165; 359/819
See application file for complete search history.

(56) References Cited

U.S. PATENT DOCUMENTS

| | | | | |
|---|---|---|---|---|
| 7,534,063 | B2 * | 5/2009 | Lin ................................ | 401/265 |
| 8,215,263 | B2 * | 7/2012 | Chuang .......................... | 118/667 |
| 2009/0314200 | A1 * | 12/2009 | Lin ................................ | 118/300 |
| 2013/0267062 | A1 * | 10/2013 | Poerrer et al. ................ | 438/106 |
| 2013/0292499 | A1 * | 11/2013 | Chu et al. ...................... | 239/589 |

\* cited by examiner

*Primary Examiner* — Jennifer C Chiang

(74) *Attorney, Agent, or Firm* — Novak Druce Connolly Bove + Quigg LLP

(57) ABSTRACT

A glue dispensing apparatus includes a container, a glue dispensing head and a heating unit. The container receives glue, and the glue dispensing head is connected to the container. The heating unit is mounted on the container. The heating unit includes a temperature sensor, a heating component, and a controller electrically connected to the temperature sensor and the heating component. The controller compares the temperature of the glue with a predetermined temperature range, controls the heating component to heat the glue when the temperature of the glue is equal to or less than a lower limit of the predetermined temperature range, and controls the heating component to stop heating when the temperature of the glue is equal to or greater than an upper limit of the predetermined temperature range.

7 Claims, 8 Drawing Sheets

GLUE DISPENSING APPARATUS WITH HEATING UNIT AND GLUE DISPENSING METHOD

BACKGROUND

1. Technical Field

The present disclosure relates to a glue dispensing apparatus and a glue dispensing method using the glue dispensing apparatus.

2. Description of Related Art

A glue dispensing apparatus includes a glue dispensing head. Glue in the glue dispensing apparatus flows out of the glue dispensing apparatus from the glue dispensing head. Yet, the glue often blocks the glue dispensing head because of a cold temperature increasing the viscosity of the glue.

Therefore, it is desired to provide a glue dispensing apparatus and a glue dispensing method which can overcome the above mentioned problems.

DETAILED DESCRIPTION

Figure 1:
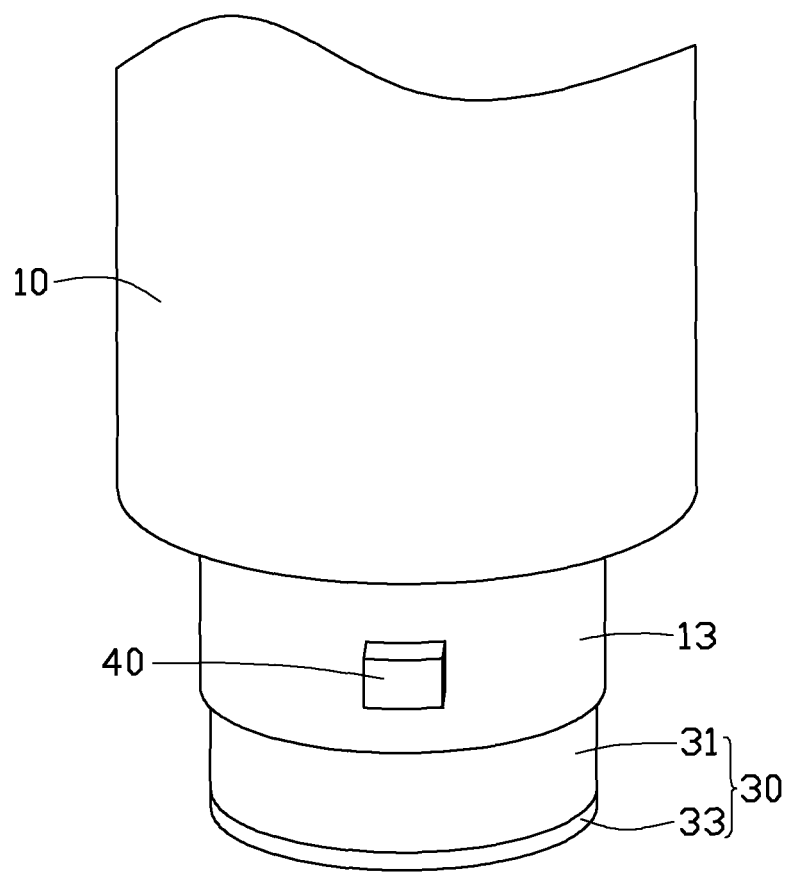
FIG. 1 is a schematic, isometric view of a glue dispensing apparatus according to a first embodiment, the glue dispensing apparatus including a heating unit.
Figure 2:
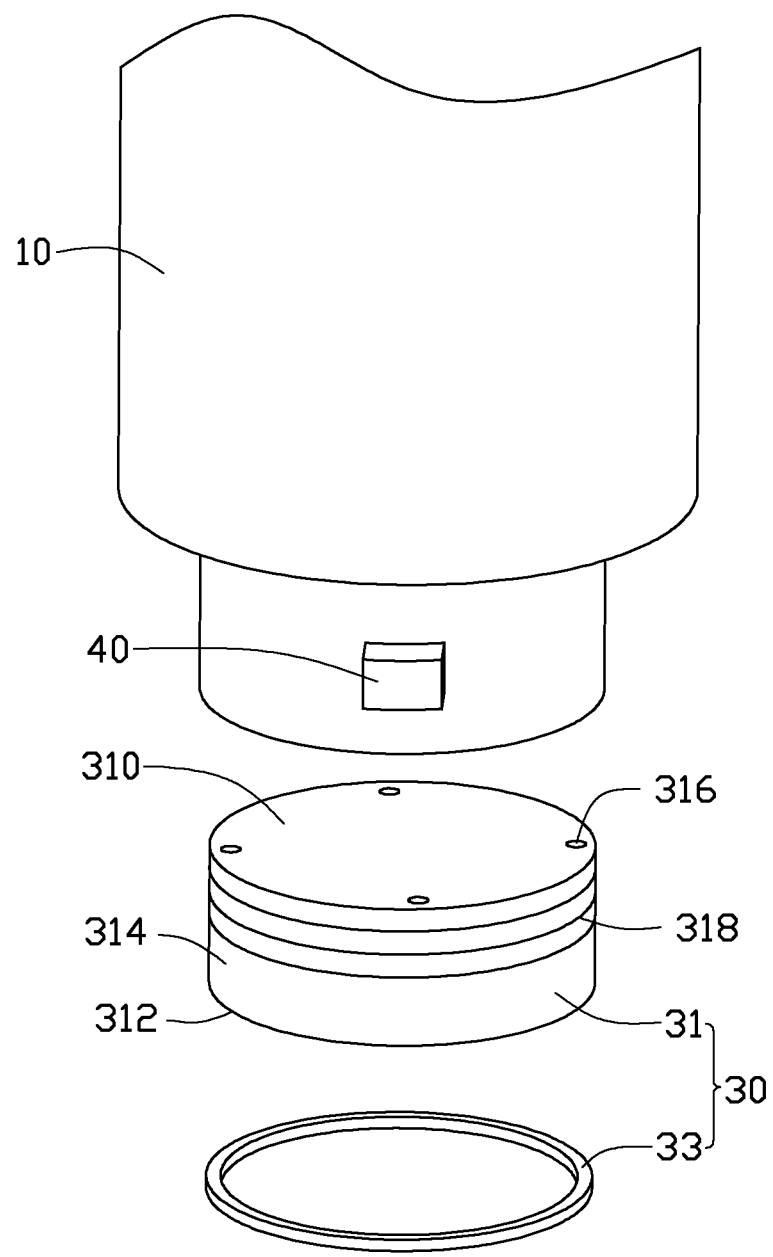
FIG. 2 is an exploded view of the glue dispensing apparatus of FIG. 1.

FIGS. 1 and 2 show a glue dispensing apparatus 100 according to a first embodiment. The glue dispensing apparatus 100 includes a container 10, a glue dispensing head 30, and a heating unit 40.

The container 10 is a hollow stepped cylinder, and defines a receiving hole 11 (see FIG. 6), the receiving hole 11 receives glue 70. The container 10 includes a thin end 13. The receiving hole 11 extends through the thin end 13. An inner sidewall of the receiving hole 11 at the thin end 13 defines a screw thread 15.

The glue dispensing head 30 is fixed at the thin end 13. The glue dispensing head 30 includes a plug 31 and a glue dispensing ring 33. The plug 31 is a cylinder, and includes a first end surface 310, a second end surface 312, and a peripheral surface 314. Through holes 316 extend from the first end surface 310 to the second end surface 312. The through holes 316 are adjacent to the peripheral surface 314. A screw thread 318 is formed on the peripheral surface 314. The plug 31 is inserted into the receiving hole 11. The first end surface 310 is positioned in the receiving hole 11. The second end surface 312 is exposed outside the container 10. The screw threads 15, 318 are engaged with each other to fix the plug 31 on the container 10. In other embodiments, the plug 31 can be fixed on the container 10 by other means such as bonding.

The glue dispensing ring 33 is made of porous material, such as porous sponge. The glue dispensing ring 33 is fixed at the second end surface 312 and covers the through holes 316. The glue 70 flows into the glue dispensing ring 33 along the through holes 316 and is absorbed by the glue dispensing ring 33. By pressing the glue dispensing ring 33, the glue 70 is extruded from the glue dispensing ring 33.

Figure 3:
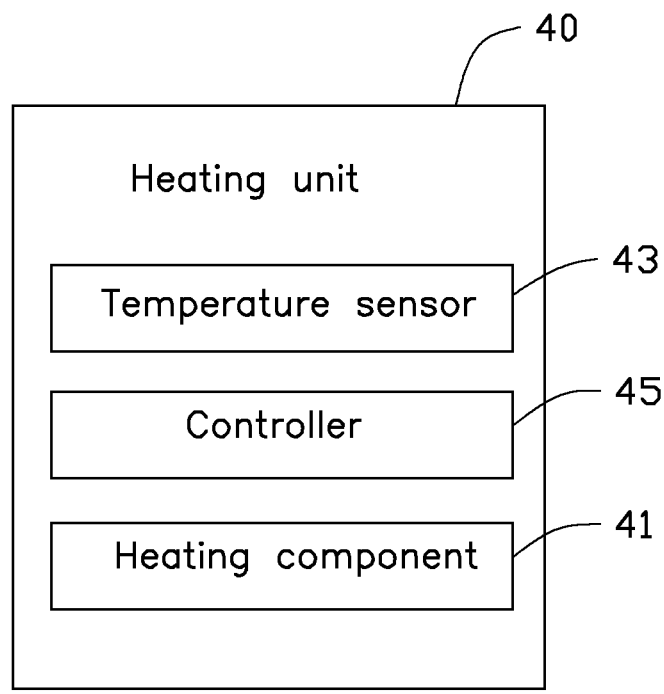
FIG. 3 is a schematic view of the heating unit of FIG. 1.

Also referring to FIG. 3, the heating unit 40 is mounted in the container 10, and includes a heating component 41, a temperature sensor 43, and a controller 45 electrically connected to the heating component 41 and the temperature sensor 43. The heating component 41 is configured for heating the glue 70 received in the container 10. The temperature sensor 43 senses the temperature of the glue 70, and sends the temperature data of the glue 70 to the controller 45. The controller 45 compares the data concerning the instant temperature with a predetermined temperature range, and controls the heating component 41 to heat the glue 70 when the sensed temperature is equal to or below a lower limit of the predetermined temperature range, and controls the heating component 41 to stop heating when the sensed temperature is equal to or greater than an upper limit of the predetermined temperature range. In this embodiment, the predetermined temperature range is from about 25° C. to about 70° C. As the glue 70 is heated, the fluidity of the glue 70 is improved and the glue 70 flows more easily out of the glue dispensing head 30, thus any blocking of the through holes 316 and the glue dispensing head 30 can be avoided.

Figure 4:
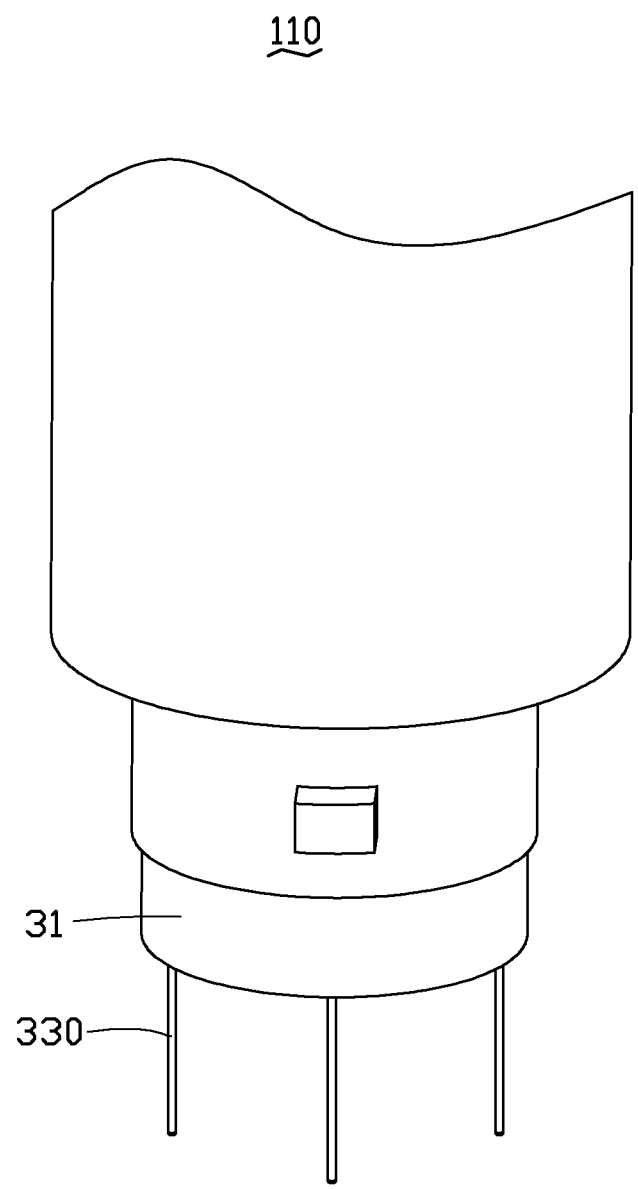
FIG. 4 is a schematic, isometric view of a glue dispensing apparatus according to a second embodiment, the glue dispensing apparatus including glue dispensing needles.
Figure 5:
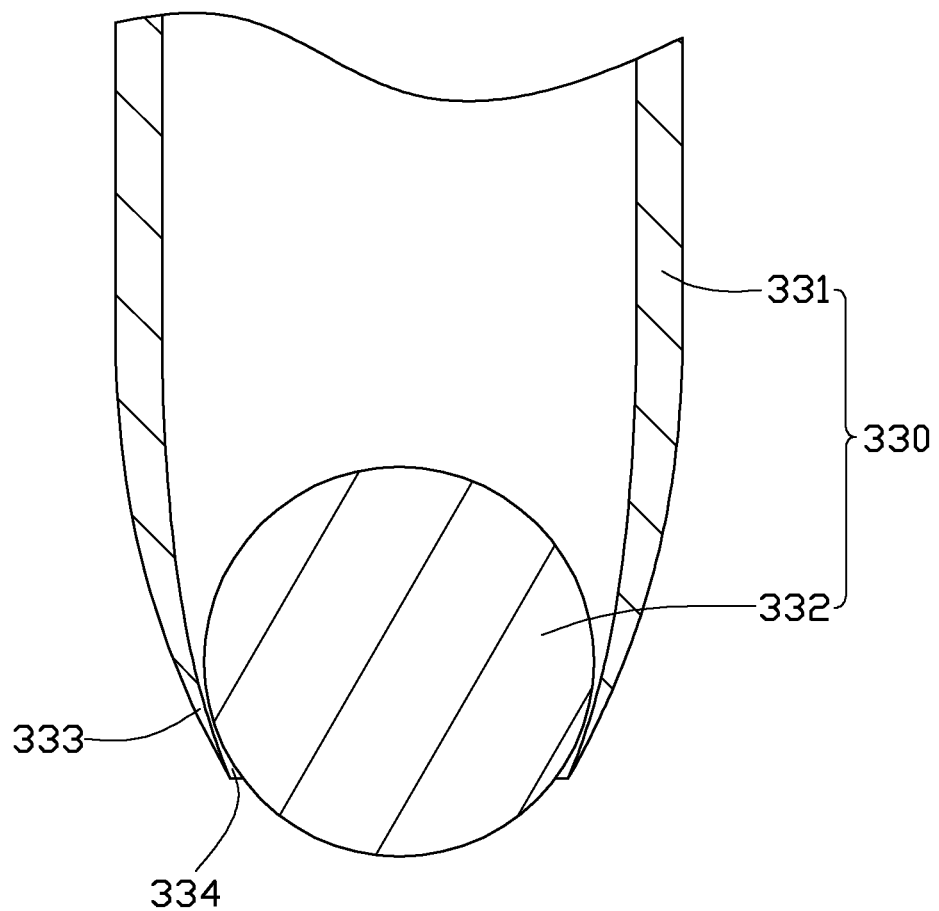
FIG. 5 is an enlarged, cross-sectional view of one of the glue dispensing needles of FIG. 4.

FIGS. 4-5 show a glue dispensing apparatus 110 according to a second embodiment. The glue dispensing apparatus 110 is similar to the glue dispensing apparatus 100 except that the glue dispensing apparatus 110 uses glue dispensing needles 330 instead of the glue dispensing ring 33. Each of the glue dispensing needles 330 includes a tube 331 and a roller ball 332. The tube 331 is fixed on the plug 31 and communicates with the through holes 316 of the plug 31. The tube 331 includes a tapering end 333. The tapering end 333 defines an opening 334. The roller ball 332 is received in the tube 331 and effectively seals the opening 334. When pressed further into the tube 331, the roller ball 332 unseals the opening 334, thus the glue 70 can flow out of the tube 331 from the opening 334.

Figure 6:
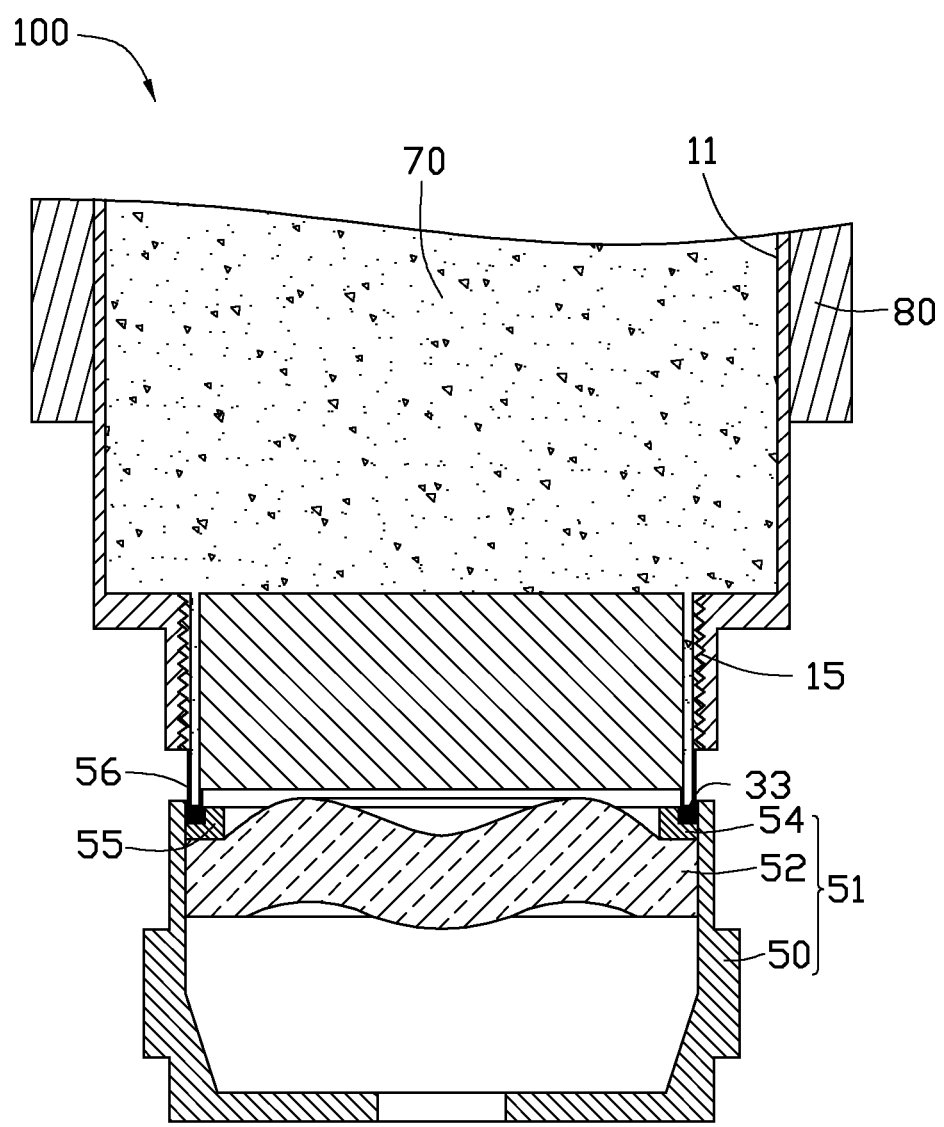
FIG. 6 is a schematic, cross-sectional view showing a glue dispensing method using the glue dispensing apparatus of FIG. 1, according to a third embodiment.

Referring to FIG. 6, a glue dispensing method using the glue dispensing apparatus 100 is shown. The glue dispensing method includes the following steps.

Step S1: a barrel 50, a lens 52, and a spacer 54 are provided. The lens 52 and the spacer 54 are put into the barrel 50 in order to obtain an unfinished lens module which is ready for gluing (RFG module 51). The spacer 54 includes an annular projection 55. A groove 56 is formed between the annular projection 55 and the inner wall of the barrel 50.

Step S2: the glue dispensing apparatus 100 is provided. The glue dispensing apparatus 100 is fixed on a driving apparatus 80. The driving apparatus 80 can drive the glue dispensing apparatus 100 towards or away from the RFG module 51.

Step S3: the heating unit 40 is activated to heat the glue 70 received in the glue dispensing apparatus 100.

Step S4: the glue dispensing apparatus 100 is moved towards the RFG module 51 until the glue dispensing ring 33 contacts a bottom wall of the groove 56.

Step S5: the glue dispensing ring 33 is lightly pressed to make the glue 70 stored in the glue dispensing ring 33 flow into the groove 56.

Step S6: the glue dispensing apparatus 100 is moved away from the RFG module 51. The glue 70 in the groove 56 bonds the spacer 54 and the barrel 50 together to obtain a finished lens module.

Figure 7:
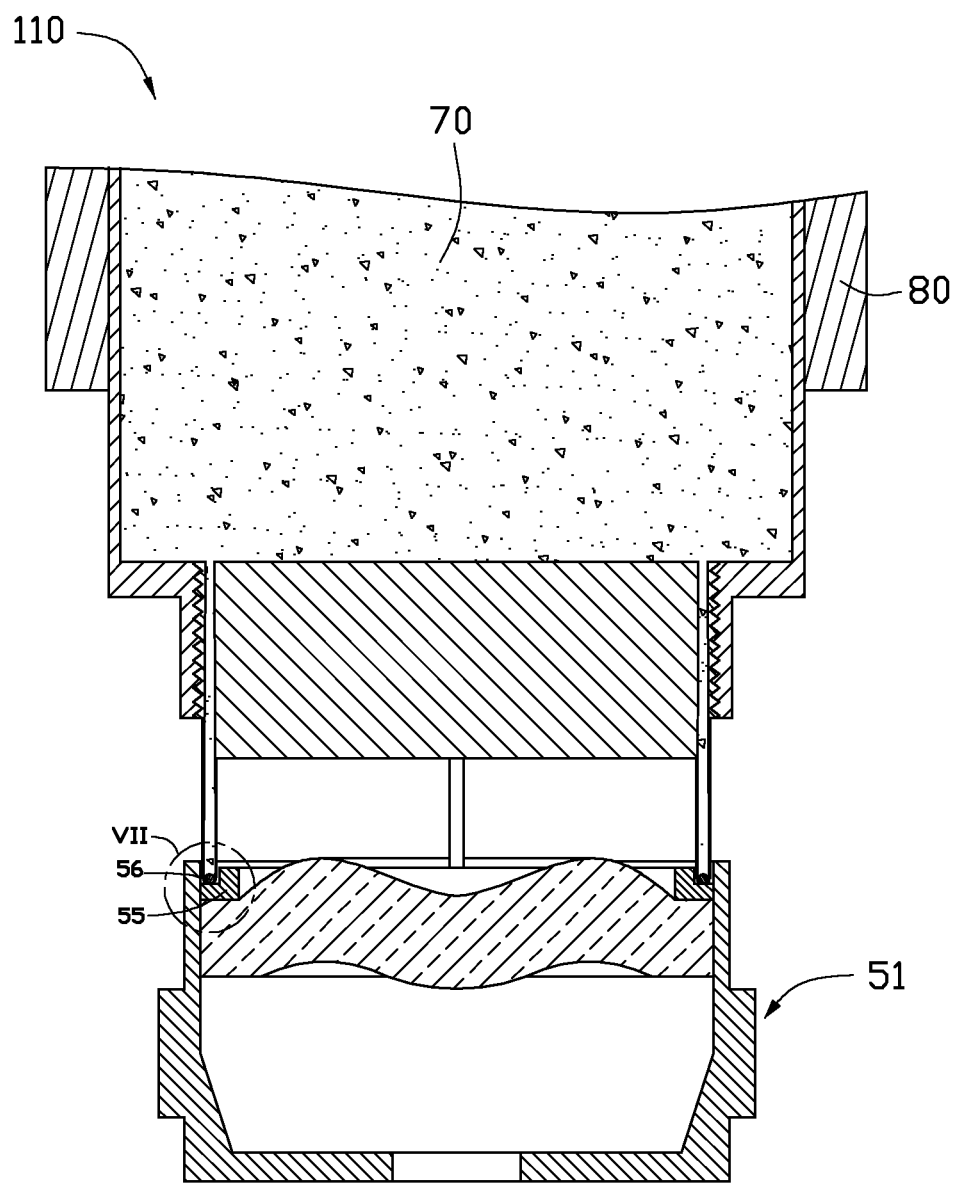
FIG. 7 is a schematic, cross-sectional view showing a glue dispensing method using the glue dispensing apparatus of FIG. 4, according to a fourth embodiment.
Figure 8:
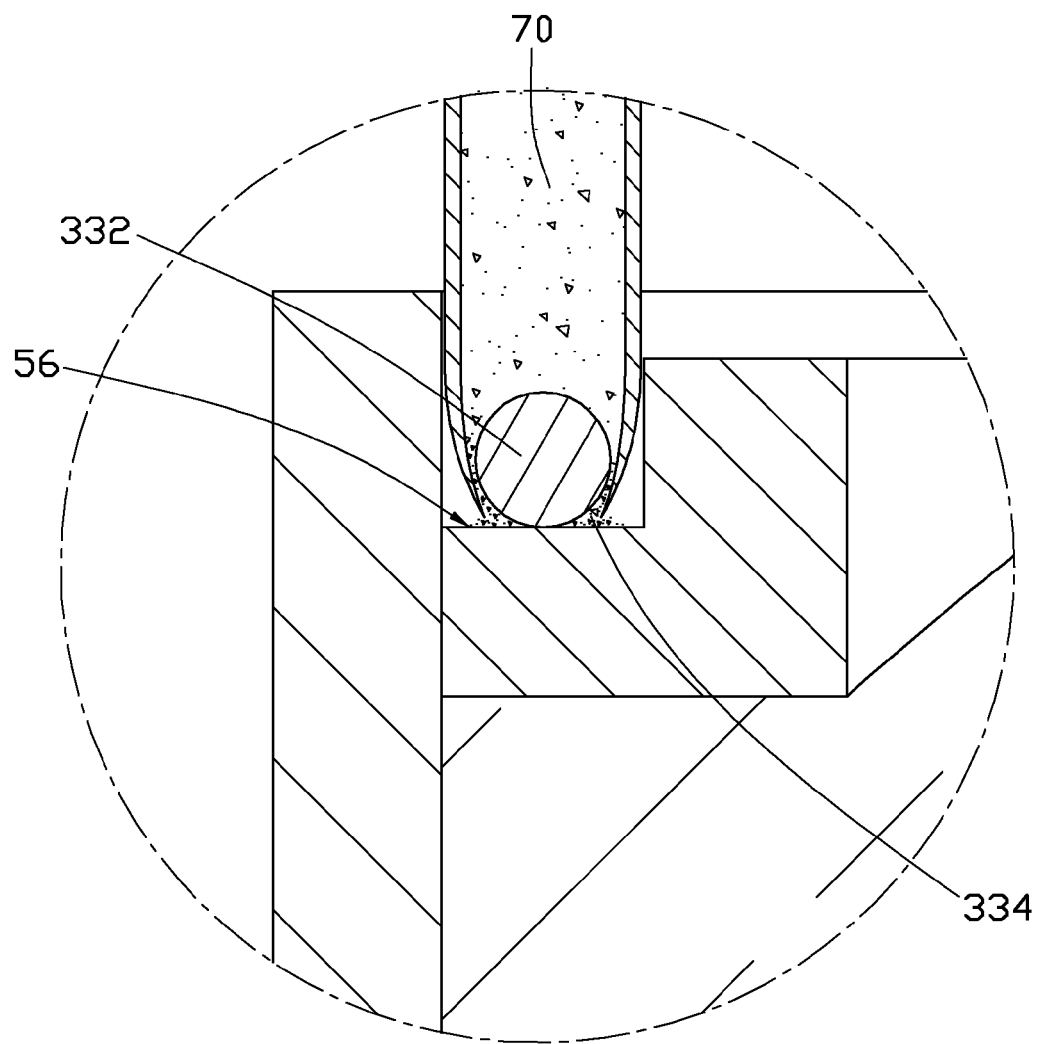
FIG. 8 is an enlarged view of a circular area VII of FIG. 7.

FIGS. 7 and 8 show a glue dispensing method using the glue dispensing apparatus 110. The glue dispensing method is similar to the glue dispensing method shown in FIG. 6, except that when being driven towards the RFG module 51, the roller ball 332 is pressed by the bottom surface of the groove 56 to unseal the opening 334, to allow the glue 70 to flow into the groove 56.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A glue dispensing apparatus comprising:
    a container configured for receiving glue, and comprising an end, the end defining a receiving hole extending through the end;
    a glue dispensing head connected to the end of the container and configured for dispensing the glue, the glue dispensing head comprising a plug partially received in the receiving hole, and the plug defines through holes communicated with the receiving hole; and
    a heating unit mounted on the container, the heating unit comprising:
        a temperature sensor configured for detecting a temperature of the glue;
        a heating component; and
        a controller electrically connected to the temperature sensor and the heating component, wherein the controller compares the temperature of the glue with a predetermined temperature range, controls the heating component to heat the glue when the temperature of the glue is equal to or less than a lower limit of the predetermined temperature range, and controls the heating component to stop heating the glue when the temperature of the glue is equal to or greater than an upper limit of the predetermined temperature range.

2. The glue dispensing apparatus of claim 1, wherein the container is a hollow stepped cylinder.

3. The glue dispensing apparatus of claim 1, wherein the plug is threaded and engaged with an inner sidewall of the receiving hole.

4. The glue dispensing apparatus of claim 1, wherein the glue dispensing head comprises a glue dispensing ring connected to the plug and covering the through holes.

5. The glue dispensing apparatus of claim 4, wherein the glue dispensing ring is made of porous material.

6. The glue dispensing apparatus of claim 1, wherein the glue dispensing head comprises glue dispensing needles fixed on the plug and communicated with the through holes.

7. The glue dispensing apparatus of claim 6, wherein each of the glue dispensing needles comprises a tube communicated with a corresponding through hole and a roller ball, the tube comprises a tapering end, the tapering end defines an opening, and the roller ball is received in the tube and closes the opening.

* * * * *